(12) United States Patent
Lau et al.

(10) Patent No.: US 7,917,440 B2
(45) Date of Patent: Mar. 29, 2011

(54) OVER-THE-AIR DELIVERY OF METERING CERTIFICATES AND DATA

(75) Inventors: Kevin Lau, Sammamish, WA (US);
Scott Plette, Seattle, WA (US); Clifford P. Strom, Sammamish, WA (US); Alex McKelvey, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1208 days.

(21) Appl. No.: 11/483,309

(22) Filed: Jul. 7, 2006

(65) Prior Publication Data
US 2008/0021833 A1    Jan. 24, 2008

(51) Int. Cl.
*G06F 21/00* (2006.01)
(52) U.S. Cl. ............... 705/52; 705/50; 705/51; 705/67; 705/69; 705/901; 705/902; 705/903; 705/904; 705/905; 705/906; 705/907; 705/908; 705/909; 705/910; 705/911; 705/912; 380/227; 380/228; 380/229; 380/230
(58) Field of Classification Search ............. 705/50–52, 705/67, 77, 901–912; 380/227–230
See application file for complete search history.

(56) References Cited

U.S. PATENT DOCUMENTS

| | | | |
|---|---|---|---|
| 5,946,614 A | 8/1999 | Robbins et al. | |
| 6,493,551 B1 | 12/2002 | Wang et al. | |
| 6,532,365 B1 | 3/2003 | Anderson et al. | |
| 6,603,761 B1 | 8/2003 | Wang et al. | |
| 7,046,682 B2 | 5/2006 | Carpenter et al. | |
| 2002/0029197 A1 | 3/2002 | Kailamaki et al. | |
| 2002/0035617 A1* | 3/2002 | Lynch et al. | 709/219 |
| 2003/0137976 A1 | 7/2003 | Zhu et al. | |
| 2004/0073515 A1* | 4/2004 | Stefik et al. | 705/52 |
| 2005/0090230 A1 | 4/2005 | Liao et al. | |
| 2005/0251403 A1 | 11/2005 | Shuey | |
| 2006/0010076 A1 | 1/2006 | Cutter et al. | |
| 2006/0036520 A1 | 2/2006 | O'Neill | |
| 2006/0097892 A1 | 5/2006 | Zigdon et al. | |

(Continued)

FOREIGN PATENT DOCUMENTS

DE    10257159 A1 *  6/2004

(Continued)

OTHER PUBLICATIONS

Vasanta, H. Distributed Management of OMA DRM Domains 2006. Retrieved on GOOGLE Nov. 10, 2010.*

(Continued)

*Primary Examiner* — James A Reagan

(57) ABSTRACT

Metering is enabled through an arrangement in which a metering certificate is communicated to a mobile device using an over-the-air protocol. A metering trigger provides the metering certificate that includes a location to which metering data is posted by the mobile device and a public key of a public-private key pair, or alternatively provides a link to such metering certificate. A metering helper passes the metering certificate to a DRM system on the mobile device which collects metering data associated with the metering ID and uses the public key to encrypt the metering data into a metering challenge. The metering helper posts the metering challenge to the location. The metering service extracts the metering data from the metering challenge using a private key and generates a metering response that is received by the metering helper which prompts the DRM system to reset at least a portion of a data store in which the metering data is stored.

11 Claims, 8 Drawing Sheets

U.S. PATENT DOCUMENTS

2007/0112676 A1* 5/2007 Kontio et al. ............... 705/50
2007/0150480 A1* 6/2007 Hwang et al. ............... 707/10

FOREIGN PATENT DOCUMENTS

| KR | 1020030030586 A | 4/2003 |
| KR | 1020030097465 A | 12/2003 |
| KR | 1020050003693 A | 1/2005 |
| KR | 1020060079816 A | 7/2006 |

OTHER PUBLICATIONS

International Search Report, PCT/US2007/015598, Dated: Jan. 9, 2008, pp. 1-10.

"mVideoGuardTM Mobile DRM Solutions", http://www.nds.com/pdfs/mVideoGuard.pdf.

Gazis et al.., "A Flexible Charging & Billing Approach for the Emerging UMTS Network Operator Role", http://citeseer.ist.psu.edu/cache/papers/cs/23863/http:zSzzSzcnI.di.uoa.grzSzpublicationszSzATS2001.pdf/gazis01flexible.pdf.

Koutsopoulou et al., "Subscription management and charging for value added services inUMTS networks", Date: 2001, pp. 2162-2166, Volume No. 3, http://ieeexplore.ieee.org/xpl/freeabs_all.jsp?arnumber=945079.

* cited by examiner

OVER-THE-AIR DELIVERY OF METERING CERTIFICATES AND DATA

BACKGROUND

Metering is a technology that enables digital media content providers to track the usage of protected media content. Metering is not generally used to track the listening habits of individual users but is rather a tally of how many times a particular piece of media content item is used (for example, how often the media content is played or copied). Thus, metering can serve a number of possible business models, such as a fee-for-use model, or a subscription model where users pay a periodic fee, (for example, every month) to enjoy limited use of media content selected from an online catalog. If the user chooses not to continue his or her subscription, the licenses for any content simply expire, disabling playback.

A media content provider commonly enables a media player running on a personal computer ("PC") or mobile device with the capability to collect and report metering data for media content that has been protected with copy protection like digital rights management ("DRM") technology. Such metering capability may be developed for such platforms, for example, through use of a software development kit ("SDK") that is licensed from a system developer. Metering provides several benefits, one of which is to reduce royalty fees for those content provider services that license content and then resell it to their customers. Royalty fees are based on the type of sale, such as whether the sale is a permanent transfer or a metered single play. Since the cost of a metered single play is much less than the cost of a permanent transfer, metering content is often much more economical for the content provider. Metering also provides other benefits. By metering content, a content provider can determine which content is more popular, identify and pay the artists whose content is played, and track the number of times an advertisement is viewed, for example.

Current metering arrangements, while satisfactory in many applications, are typically dependent on a proxy device such as a PC that functions as an intermediary between a metering service and a mobile device using, for example, a docking-type connection. The PC is used to deliver a metering certificate (which identifies the location to which metering data is to be reported) to the mobile device as well as trigger a metering event. However, the mobile device is thus unable to receive a metering certificate and report metering data when it is not coupled to the proxy device.

SUMMARY

Metering is enabled through an arrangement in which a metering certificate is communicated to a mobile device using an over-the-air protocol. In various illustrative examples, a metering service sends to a mobile device a metering trigger that includes a metering certificate, or alternatively, a link to a metering certificate. The metering certificate includes a location to which metering data is to be posted by the mobile device, a metering ID, and a public key of a public-private key pair.

The mobile device is provisioned with a metering helper application which is started upon receipt of the metering trigger. The metering helper application passes the metering certificate to a DRM system on the mobile device. The DRM system collects metering data associated with the metering ID and uses the public key to encrypt the collected metering data into a metering challenge. The DRM system passes the metering challenge to the metering helper application which posts it to the location identified in the metering certificate. The metering service extracts the metering data from the metering challenge using a private key of the public-private key pair. The metering service generates a metering response that is received by the metering helper application which prompts the DRM system to reset at least a portion of a data store in which the metering data is stored.

The present arrangement advantageously enables media content to be readily accessed and consumed by a consumer using a mobile device in preferred locations without the need for a proxy device to receive a metering certificate or enable reporting of metering data to the metering service.

DETAILED DESCRIPTION

Figure 1:
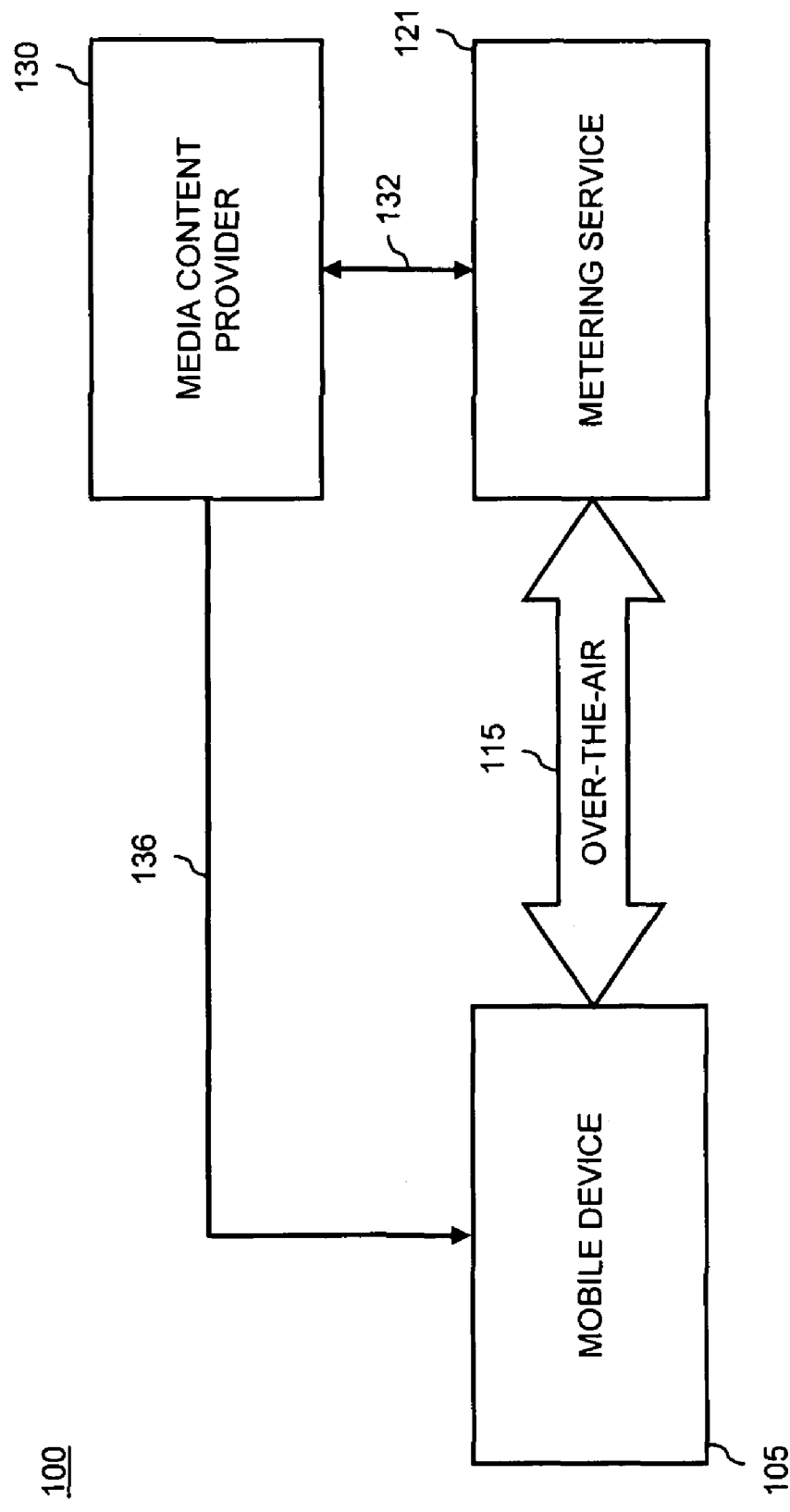
FIG. 1 is a block diagram of an illustrative arrangement for delivering a metering certificate and reporting metering data over-the-air.

Turning to the drawings, where like numerals designate like components or elements, FIG. 1 is a block diagram of an illustrative arrangement 100 for delivering a metering certificate and reporting metering data over-the-air. As shown in FIG. 1, a mobile device 105 is provided with over-the-air communications 115 with a metering service 121. "Over-the-air" as used herein means an arrangement in which any type of wireless communication using open space as its transmission medium is utilized for communications between the mobile device 105 and metering service 121. Over-the-air communication may be enabled, for example, between the mobile device 105 and metering service 121 with the Short Messaging Service ("SMS") using the Wireless Application Protocol ("WAP"). For example, as described in detail below, the metering service may send a WAP Push SMS message to the mobile device 105, although Direct Push (i.e., IP push) messaging arrangements may also employ over-the-air communications.

Mobile device 105, in this illustrative example, is selected from any one of a variety of mobile devices that are commonly used by consumers to select, access and consume media content such as music, video, audio, news, ring tones, games, data, or the like. Accordingly, mobile device 105 is selected from one of portable media player, personal digital assistant, pocket PC, music player, mobile phone, smart phone, handheld game device or the like. However, it is emphasized that this list of devices is merely illustrative as the benefits and features of over-the-air delivery of metering certificates and metering data may be realized by many types of electronic devices that are configured to render or otherwise consume media content when arranged to implement the features described herein.

Metering service 121 is representative of a service that collects and processes metering data. Metering service 121 may be provided, for example, by a metering aggregation service that is contracted by a media content provider 130 (e.g., a media content licensor or subscription service provider), or a media content owner as indicated by line 132 in FIG. 1. Alternatively, metering service 121 is provided directly by the media content provider 130 to the mobile device 105 (this alternative arrangement is not shown in FIG. 1). Metering service 121, in this illustrative example, is implemented using an application or data server that is configured to send and receive communications to and from mobile device 105 to thereby implement a server-client-type architecture.

Media content provider 130 is typically arranged to provide media content to mobile device 105 as indicated by line 136. Such media content is deliverable using a variety of mechanisms including the transfer of a physical media (i.e., an optical disc such as CD, DVD, high-definition disc, Flash memory card etc.) to the mobile device 105, or via download from the media content provider 130. In addition, although not mandatory in the present arrangement, media content provider 130 commonly provides a license, such as a DRM license, to mobile device 105 from a license server or rights management server (not shown). Such license generally provides the usage rules, rights or restrictions that the media content provider 130 imposes on the use of the delivered media content. The license also commonly includes a metering ID that is associated with the delivered media content so that metering data for that particular media content may be tracked and reported separately from media content delivered by another media content provider (for example, a consumer may subscribe to two music services and download metered media content from each). In this illustrative example, the delivered media content and the license are deliverable over-the-air or alternatively using a proxy device such as a PC.

Figure 2:
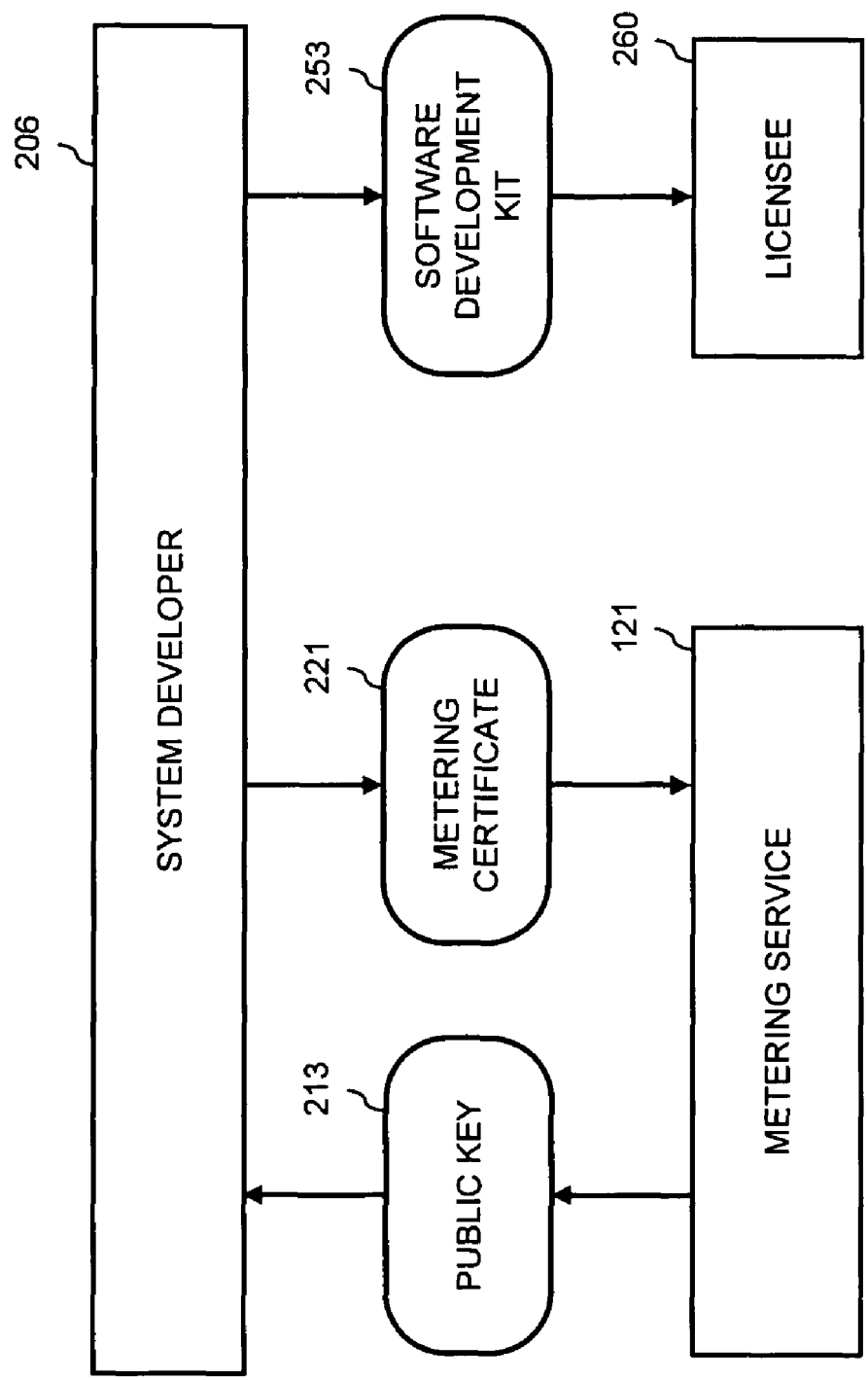
FIG. 2 is a block diagram showing an illustrative arrangement in which a system developer provides a metering certificate to a metering service, receives a public key from the metering service, and provides a software development kit to a licensee.

FIG. 2 is a block diagram showing an illustrative arrangement 200 in which a system developer 206 provides a metering certificate 221 to the metering service 121 (FIG. 1) and receives a public key 213 from the metering service 121. The public key 213 is part of a public-private key pair that is typically generated by the metering service 121 and used to implement secure communication of data between a server and a client using known cryptographic techniques without requiring that passwords or other keys be exchanged in the clear. The metering service 121 sends the public key 213 to the system developer 206 for certification while retaining the private key of the public-private key pair that is needed to decrypt information encrypted with the public key 213. The system developer 206 creates the metering certificate 221 with the embedded public key 213 as shown in FIG. 4 and described in more detail in the accompanying text below.

As shown in FIG. 2, system developer 206 also provides a software development kit ("SDK") 253 to a licensee 260. In some applications of over-the-air delivery of metering certificates and metering data, the licensee 260 is the media content provider 130 (FIG. 1) or media content owner. Alternatively, licensee 260 is metering service 121 or another entity. In the present arrangement, the licensee 260 typically utilizes the SDK 253 to create a metering helper application that is configured to run on the mobile device 105 and which facilitates over-the-air delivery of metering certificates and metering data. The metering helper application is described in detail in the text accompanying FIG. 5.

Figure 3:
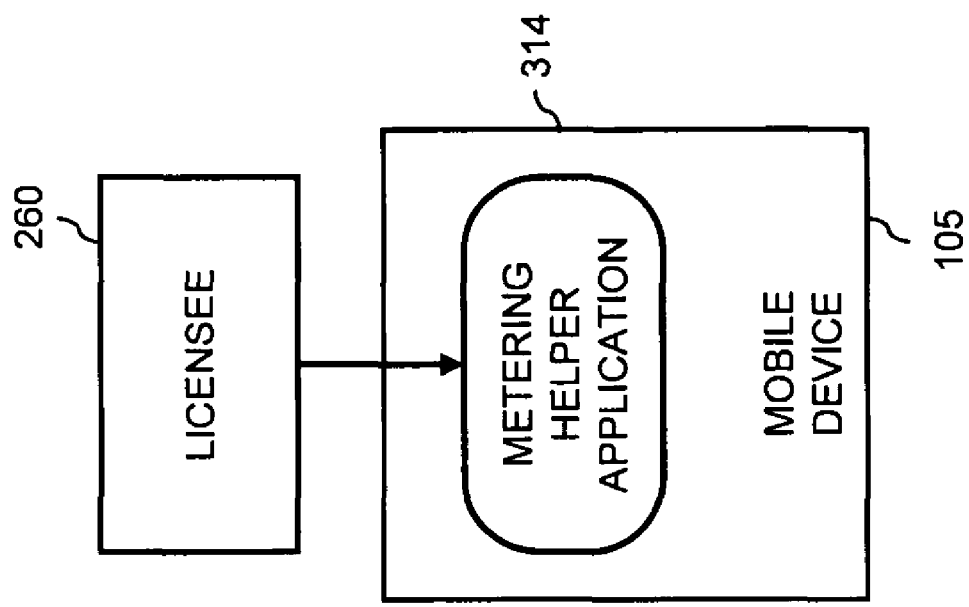
FIG. 3 is a block diagram showing an illustrative arrangement in which a licensee provides a metering helper application to a mobile device.

As shown in FIG. 3, the licensee 260 provides a metering helper application 314 to the mobile device 105. The metering helper application 314 is pre-provisioned to the mobile device 105 in some settings of over-the-air delivery of metering certificates and metering data. In other settings, the metering helper application 314 is arranged to be downloaded by the mobile device 105 (FIG. 1) as an application or plug-in as needed or on-demand.

Figure 4:
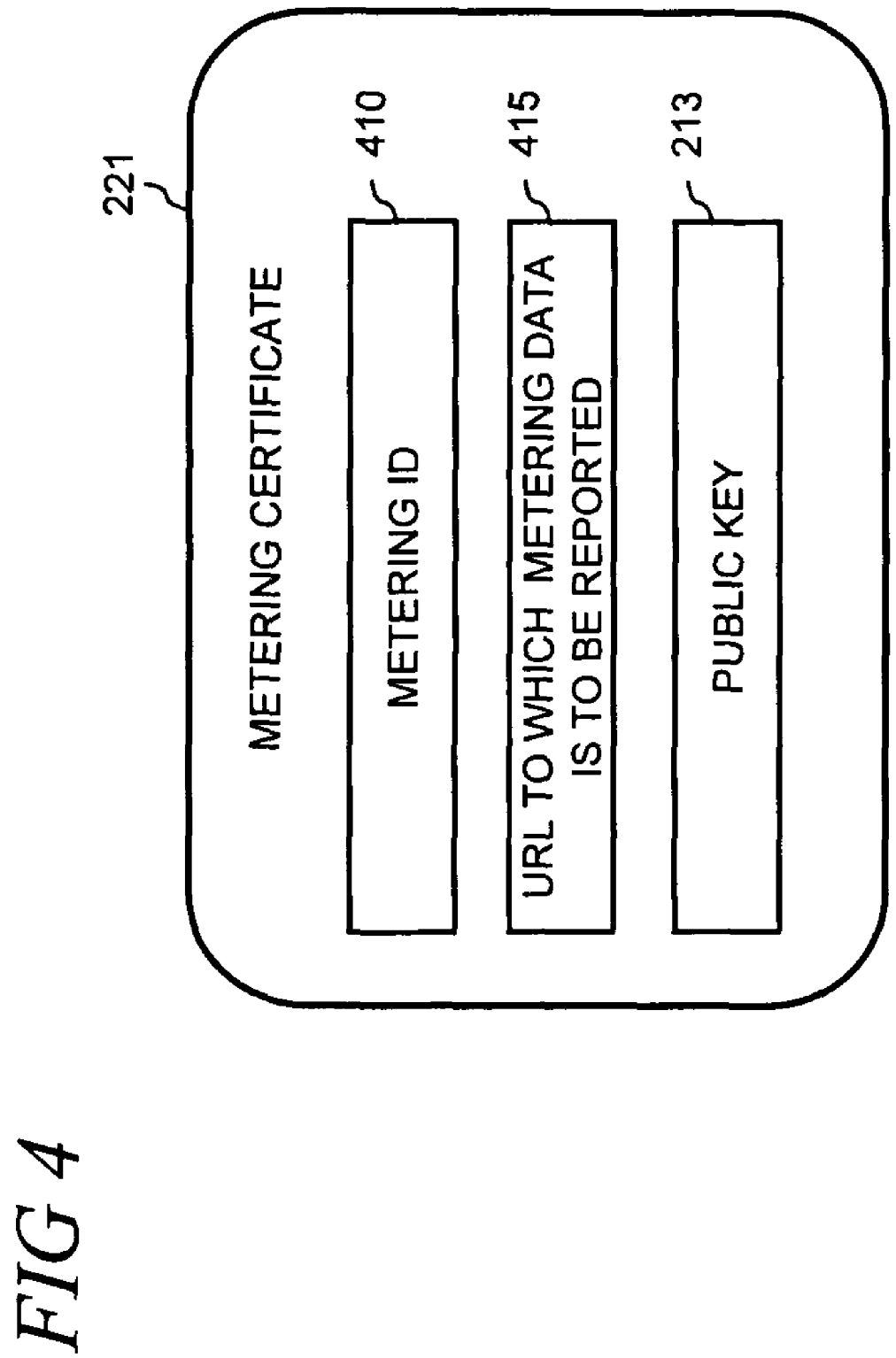
FIG. 4 is a diagram showing an illustrative metering certificate.

FIG. 4 is a diagram showing an illustrative arrangement for the metering certificate 221 shown in FIG. 2. As shown in FIG. 4, metering certificate 221 includes three components including a metering ID 410, URL (uniform resource locator) 415 and public key 213. Metering ID 410 is used to identify the content provider for which metering data is being collected in cases where a consumer is anticipated to have media content stored on mobile device 105 that comes from more than one content provider.

URL 415 provides the address to which metering data is to be reported by the mobile device 105. In this illustrative example, metering data is posted to the URL 415 using the HTTP POST command. HTTP, or hypertext transfer protocol, is an open internet protocol used to implement asynchronous communications between a client and a server. Typically, the URL 415 shares a common domain name with the license source such as the license server or rights management server described above in the text accompanying FIG. 1.

Figure 5:
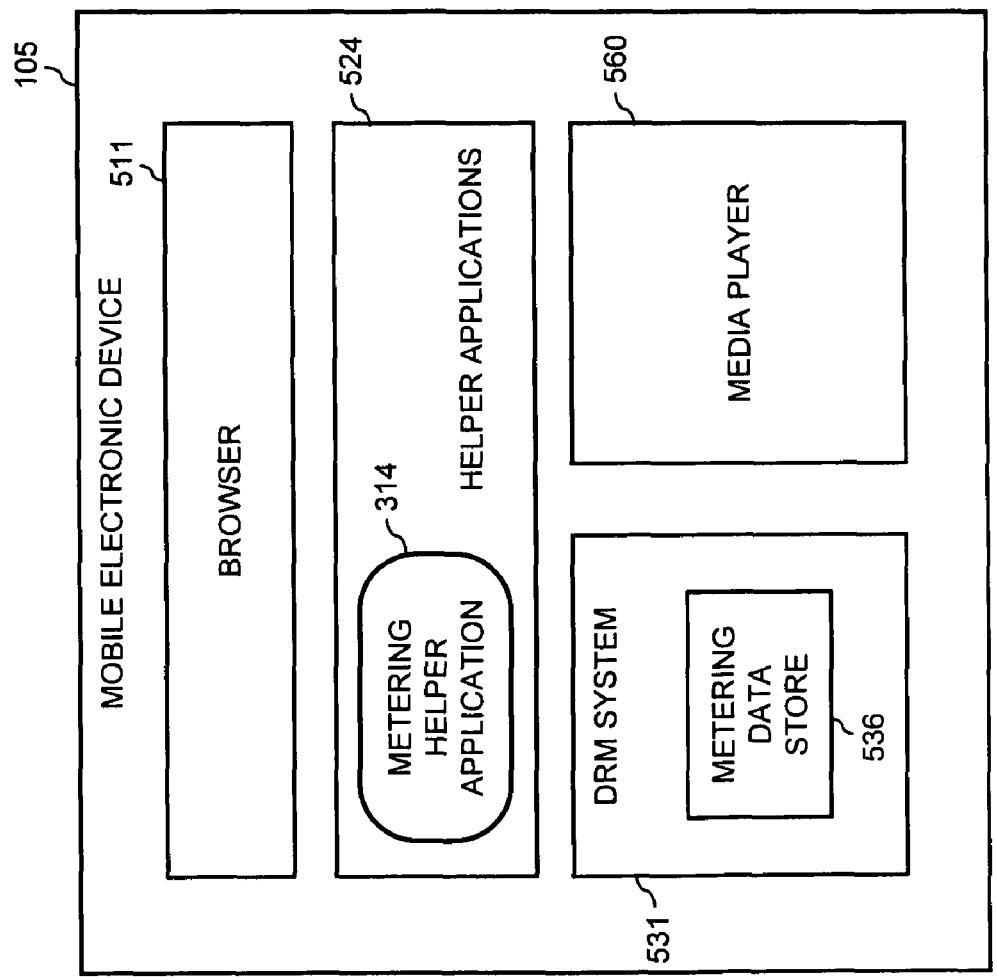
FIG. 5 is a diagram showing the components of an illustrative mobile device that is arranged to receive a metering certificate and report metering data over-the-air.

FIG. 5 is a diagram showing an illustrative arrangement for mobile device 105 (FIG. 1). Mobile device 105 is configured to include a networking interface such as the browser 511 shown in FIG. 5. Alternatively, the networking interface may comprise a WAP/HTTP handler or a Direct Push handler. The networking interface (e.g., browser 511) is arranged to send and receive messages and other data using over-the-air communication protocols. Mobile device 105 is further configured to include one or more helper applications 524, a DRM system 531 and a media player 560.

Helper applications 524 may include one or more applications that are configured to perform a variety of tasks depending on the specific configuration of the mobile device 105. Helper applications 524 are used in settings where browsers do not include enough functionality to interact directly with a DRM system, as is often the case with browsers that are arranged to operate on mobile devices. Typically, the helper applications 524 reside at the native level of the mobile device 105 and act as a proxy between the browser 511 and the DRM system 531. Accordingly, helper applications 524 have interfaces to both the browser 511 and DRM system 531 and are identified as trusted entities to each.

In this illustrative example, helper applications 524 include metering helper application 314 as shown. Metering helper application 314 is used by the mobile device 105 to implement the message flow shown in FIG. 6 and described in the accompanying text. Helper applications 524 may also include a license acquisition helper, for example.

DRM system 531 in FIG. 5 is used to implement the secure receipt of media content from the media content provider 130 (FIG. 1) and further enables use and playback of the media content on the media player 560 in accordance with the usage rules, rights, or restrictions imposed by the license associated with the media content. In addition, DRM system 531 records and stores metering data for metered media content, typically by metering ID, that is stored on, and later reported by the mobile device 105. DRM system 531 thus includes a metering data store 536 that is used to store metering data recorded by DRM system 531.

Figure 6:
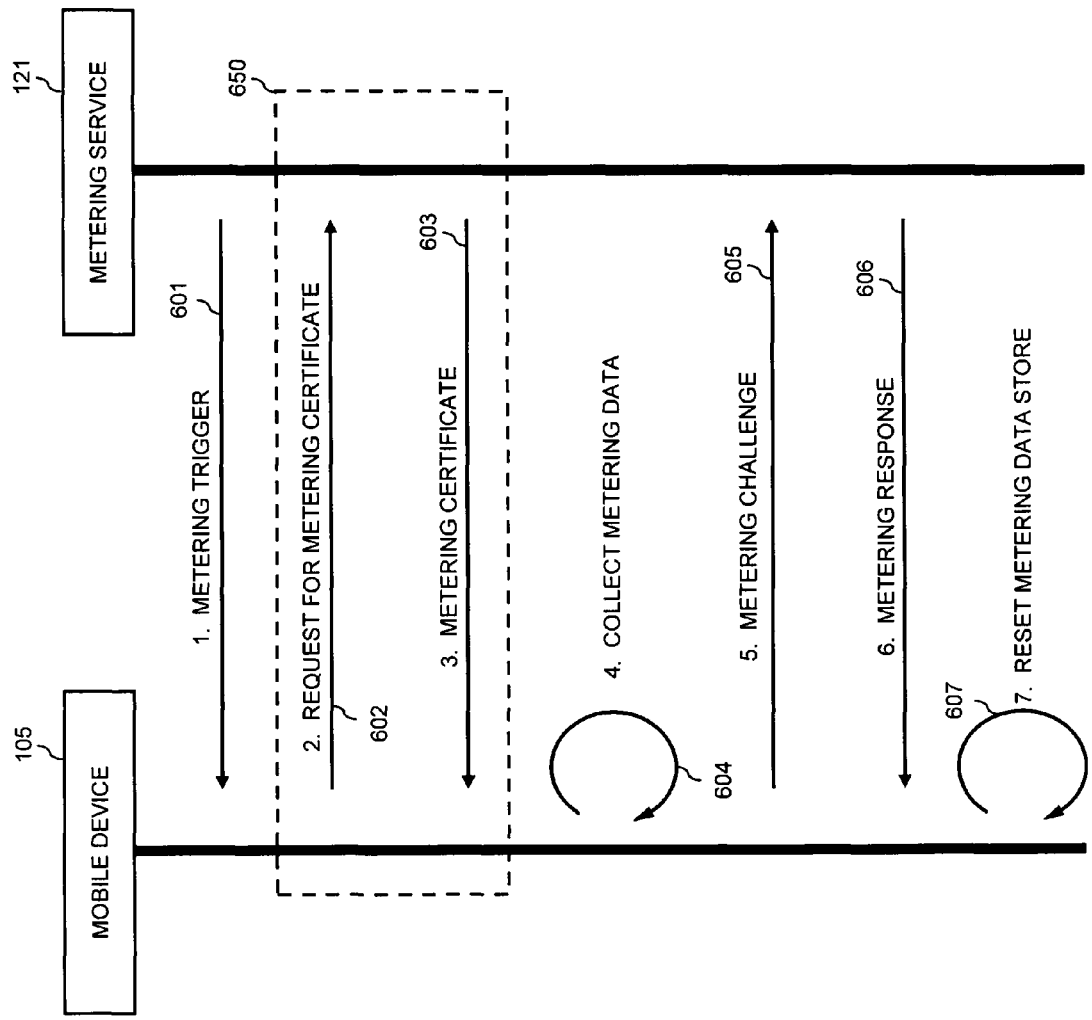
FIG. 6 is a diagram showing an illustrative message flow between a mobile device and a metering service.

FIG. 6 is a diagram showing an illustrative message flow between the mobile device 105 and metering service 121 that is arranged in a sequence of seven steps. Metering service 121 first generates a metering trigger 601 to initiate a request for a metering report from the mobile device 105. In various alternative implementations, metering trigger 601 is arranged as a WAP Push SL (serviceload) SMS that is directed towards a particular consumer or subscriber using the mobile device 105, or as a WAP Push SI (service indicator) SMS if a user "accept" prompt is desired. The metering trigger 601 (e.g., WAP Push) contains a URL to the metering certificate 221 (FIG. 4).

Figure 7:
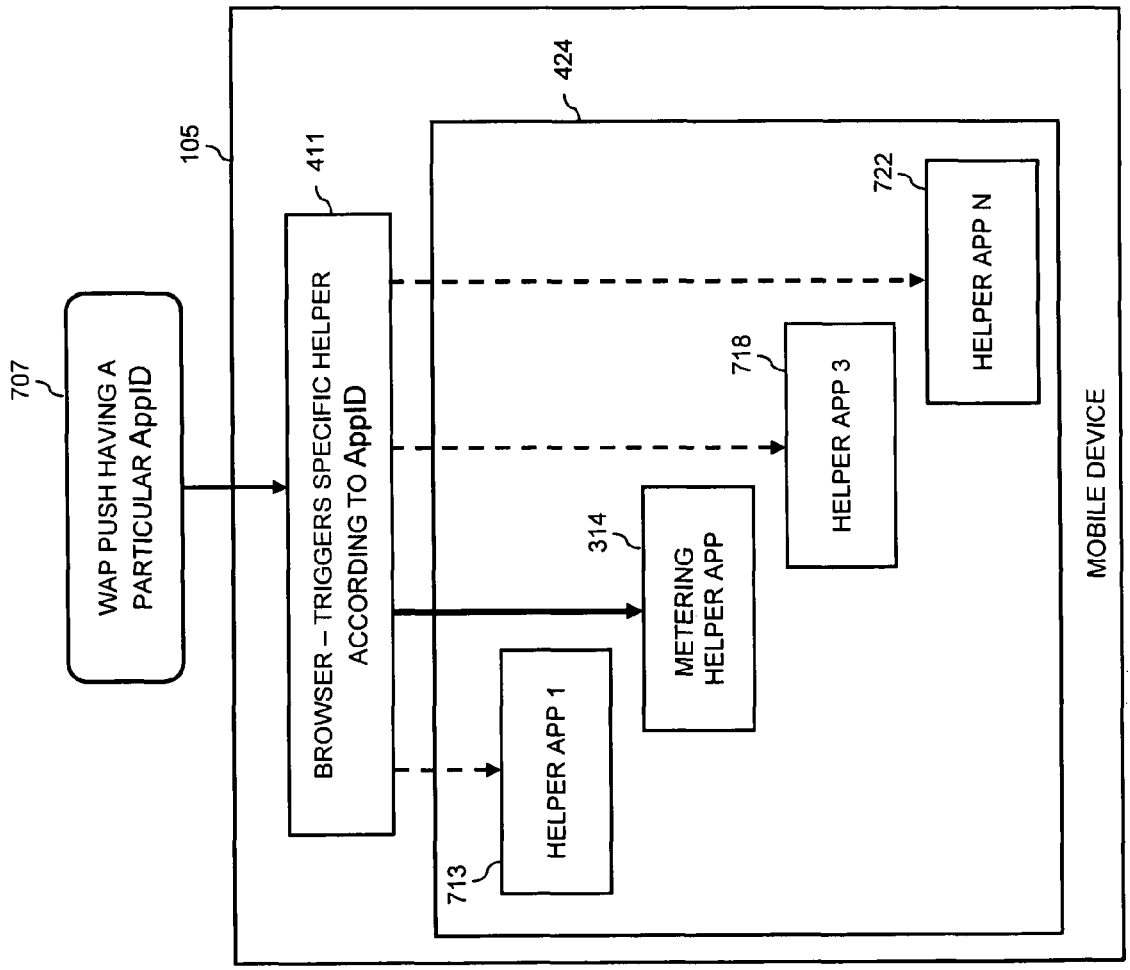
FIG. 7 is a diagram showing an illustrative arrangement for handling a WAP push that includes a particular AppID.

As shown in FIG. 7, the WAP Push may include a particular WAP AppID that is configured so that, upon receipt by browser 411, a specific helper application among the helper applications 424 disposed on mobile device 105 is triggered. In an illustrative example shown in FIG. 7, the WAP AppID contained in WAP Push SMS message 707 is set to trigger metering helper application 314 among the remaining helper applications 1, 2 . . . N as indicated respectively by reference numerals 713, 718 and 722.

Returning back to the metering trigger 601 in FIG. 6, optionally, if a direct data push (e.g., an IP Push) is able to be used with mobile device 105, then a WAP Push in not necessary. Instead, metering service 121 may send a message to mobile device 105 which incorporates the metering certificate 221 itself (rather than a URL for the metering certificate as described above) in the body of the message. In this case, the metering helper application 314 is invoked through the message MIME type (Multipurpose Internet Mail Extension), as described below, but the metering helper application 314 skips to step four (collect metering data).

As indicated by reference numeral 602, upon receipt of the metering trigger 601 (e.g., the WAP Push SMS message), the metering helper application 314 in mobile device 105 follows the URL contained in the metering trigger 601 to obtain the metering certificate 221, typically using HTTP. The metering service 121 returns the metering certificate 221 to the mobile device as shown by reference numeral 603. As noted above, in cases where a Direct Push message is utilized, steps 3 and 4 are not required as indicated by the dashed rectangle 650 in FIG. 6.

It is further noted that there is no requirement that the mobile device 105 begins collecting the requested metering data or send back its metering report immediately upon receiving the metering trigger 601. Depending on the requirements of a specific application of over-the-air delivery of metering certificates and metering data, the mobile device 105 is arranged to perform the collecting and reporting at some later time.

Figure 8:
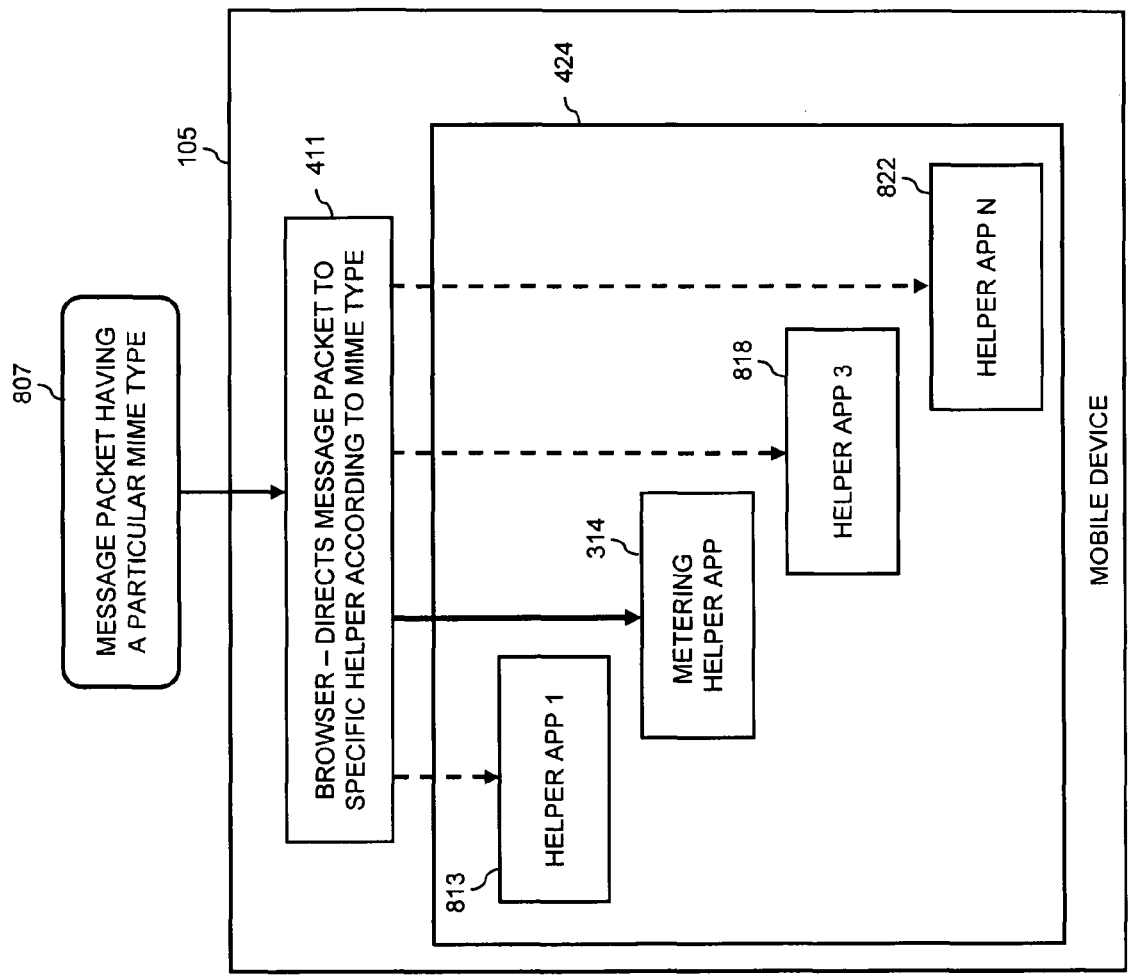
FIG. 8 is a diagram showing an illustrative arrangement for handling a message packet that includes a particular MIME type.

As shown in FIG. 8, the messages sent by the metering service 121 (FIG. 1) to mobile device 105 (FIG. 1) are configurable with a set one of a plurality of MIME types. The MIME type is included in the content type field in the HTTP header. Upon receipt by browser 411 of a particular MIME type, the appropriate helper application may be triggered, if required, and the message is passed to the helper application for handling. Table 1 shows two illustrative MIME type names and associated description that are configured to direct an incoming message to the metering application helper 314 (FIG. 3). Of course, other helper applications 524 (FIG. 5) would use MIME types other than those listed in Table 1.

TABLE 1

| MIME Type Name | Description |
| --- | --- |
| application/vnd.ms-wmdrm.meter-chlg-req | This MIME type is used for messages from the metering service that contain the metering certificate. |
| application/vnd.ms-wmdrm.meter-resp | This MIME type is used for messages from the metering service which contain the prompt to clear out part or all of the metering data store. |

In an illustrative example shown in FIG. 8, the MIME type of an incoming message packet 807 is set so that the message packet is delivered to the metering helper application 314 among the remaining helper applications 1, 2 . . . N as indicated respectively by reference numerals 813, 818 and 822.

Returning again to FIG. 6, the illustrative message flow continues with collection of metering data at the mobile device 105 as indicated by reference numeral 604. Here, the metering helper application 314 passes the metering certificate 221 received from the metering service 121 to the DRM system 531 (FIG. 5). In particular, metering helper application 314 works through its interface to DRM system 531 which exposes an API (application programming interface) to thereby access and collect the requested metering data. In most applications in which a consumer has stored metered media content from more than one content provider, DRM system 531 collects metering data that is associated with a particular metering ID.

Next, the DRM system 531 generates a metering challenge message 605. The metering challenge 605 incorporates the collected metering data that the DRM system 531 encrypts using the pubic key 213 (FIG. 2) included in the metering certificate 221 passed from the metering helper application 314. Depending on the amount of metering data contained in metering data store 536 and the size of the buffer utilized, more than one metering challenge 605 may be utilized to report all of the appropriate metering data to the metering service 121. DRM system 531 passes the metering challenge 605 to the metering helper application 314. The metering helper application 314 in turn posts the metering challenge 605 to URL 415 (FIG. 4), typically using HTTP POST as noted above.

An optional arrangement may be utilized in cases where the mobile device 105 stores metered content provided by more than one media content provider (so that metering data is stored in metering data store 531 using more than one metering ID). In such cases, metering helper application 314 is configured to report metering data for each of a plurality of metering IDs from DRM system 531 upon receipt of a "report all metering data" trigger. In this case, mobile device 105 acquires a plurality of metering certificates to thereby collect and report the appropriate metering data. Metering application helper 314 then requests that DRM system 531 prepare a plurality of metering challenges using the metering certificates where each one of the plurality of metering challenges contains metering data associated with a particular metering ID. DRM system 531 passes each respective metering challenge to metering helper application 314 which then posts it to the respective metering service associated with the metering ID. Such collection and reporting may be performed in an iterative manner to thereby implement metering reporting to a plurality of metering services in a batch-type arrangement.

Upon receiving the metering challenge 605, the metering service 121 extracts the encrypted metering data contained therein with its private key of the public-private key pair shown in FIG. 2 and described in the accompanying text. The metering service 121 uses or stores the extracted metering data as necessary, for example, to identify and pay artists whose content is being played.

Once the metering data is received and extracted, the metering service 121 generates a metering response message 606 that is sent to the mobile device 105. The metering response 606 is utilized by the client to reset that portion of the metering data store 536 used to store the metering data that is contained in the metering challenge. The metering helper application 314 passes the received metering response 606 to the DRM system 531 to thereby prompt it to reset the appropriate portion of the meter store 536 as indicated by reference numeral 607 in FIG. 6.

Although various illustrative arrangements and methods for over-the-air delivery of metering certificates and metering data have been shown and described, it should be understood that the scope of the claims appended hereto shall not necessarily be limited to the specific features, arrangements or methods described. Instead, the specific features, arrangements or methods are disclosed as illustrative forms over-the-air delivery of metering certificates and metering data as more particularly claimed below.

What is claimed is:

1. A method for collecting metering data by a metering service from a client, the method comprising the steps of:
    sending to the client a metering trigger, said metering trigger including at least one of the group consisting of a metering certificate that is embedded therein and a link to the metering certificate, and wherein the client is a mobile device and the metering certificate includes a public key of a public-private key pair;
    receiving a metering challenge from the client, wherein the metering challenge includes metering data and is received directly at the metering service from the client using over-the-air communications;
    using a private key of the public-private key pair, decrypting the metering data included in the metering challenge received from the client wherein the metering data is encrypted by the client using the public key; and
    generating a metering response to prompt the client to reset at least a portion of a data store for the metering data contained in the metering challenge.

2. The method of claim 1 in which metering trigger is contained in a message using an over-the-air protocol selected from one of WAP Push or Direct Push.

3. The method of claim 2 in which the WAP Push comprises a WAP Push SL SMS or a WAP Push SI SMS.

4. The method of claim 2 in which the WAP Push includes an AppID having a unique value to thereby start a metering helper application residing on the client.

5. The method of claim 1 including the further step of providing the metering certificate to the client in a package having a set MIME type to thereby instruct a networking interface in the client to pass the metering certificate to a metering helper application running on the client.

6. The method of claim 1 including the further of step of providing the metering response to the client in a package having a set MIME type to thereby instruct a networking interface in the client to pass the metering response to a metering helper application running on the client.

7. The method of claim 1 in which the metering certificate further includes a metering ID, or a URL to which the metering data is reported.

8. A method for metering media content usage on a mobile device, the method comprising the steps of:
    providing an SDK for implementing a metering helper application that is installable on the mobile device so as not to use a proxy device such as a PC to thereby enabling metering reporting directly from the mobile device to the metering service;
    creating a metering certificate including a public key of a public-private key pair, a URL to which metering data is to be posted, and a metering ID associated with a metering service; and
    providing the metering certificate to the metering service.

9. The method of claim 8 in which the metering helper application is arranged to pass the metering certificate received from the metering service to a DRM system which uses the public key from the metering certificate to generate a metering challenge that includes metering data for the metering ID.

10. The method of claim 9 where the metering challenge is posted to the URL by the metering helper application.

11. The method of claim 8 in which the metering service uses a private key of the public-private key pair to extract the metering data from the metering challenge.

* * * * *